United States Patent [19]

Moore

[11] Patent Number: 5,388,369

[45] Date of Patent: Feb. 14, 1995

[54] DEVICES AND METHODS FOR SELECTIVE APPLICATION OF HERBICIDE

[76] Inventor: James E. Moore, 555 Riviera Dr., Naples, Fla. 33940

[21] Appl. No.: 889,104

[22] Filed: May 26, 1992

[51] Int. Cl.$^6$ ............................................. A01C 15/00
[52] U.S. Cl. ....................................................... 47/1.5
[58] Field of Search ............................................ 47/1.5

[56] References Cited

U.S. PATENT DOCUMENTS

| | | |
|---|---|---|
| 71,036 | 11/1867 | Merritt . |
| 348,508 | 8/1886 | Barber . |
| 633,779 | 9/1899 | Bagley . |
| 737,102 | 8/1903 | Holt . |
| 807,887 | 12/1905 | Walker . |
| 876,612 | 1/1908 | Watkins . |
| 1,189,505 | 7/1916 | Stockton . |
| 1,454,824 | 5/1923 | Stubfors . |
| 1,820,583 | 8/1931 | Switzer . |
| 2,055,314 | 9/1936 | Seburger . |
| 2,223,809 | 12/1940 | Rucker ............................ 47/1.5 |
| 2,323,595 | 7/1943 | Hanisch . |
| 2,659,918 | 11/1953 | Stoner . |
| 2,776,667 | 1/1957 | FitzGerald . |
| 2,788,537 | 4/1957 | Greenberg . |
| 2,811,732 | 11/1957 | Okamoto . |
| 2,819,484 | 1/1958 | Fouse . |
| 2,908,923 | 10/1959 | Schlechter . |
| 2,957,190 | 10/1960 | Stark . |
| 2,975,520 | 3/1061 | Ericson . |
| 2,988,849 | 6/1961 | Laughlin . |
| 2,994,142 | 8/1961 | Newell et al. . |
| 3,002,319 | 10/1961 | Laughlin . |
| 3,009,290 | 11/1961 | Bratton . |
| 3,021,642 | 2/1962 | Ewing ............................ 47/1.5 |
| 3,048,878 | 8/1962 | Gray et al. . |
| 3,056,998 | 10/1962 | Ebner . |
| 3,077,701 | 2/1963 | Osmun . |
| 3,086,241 | 4/1963 | Bohn . |
| 3,114,928 | 12/1963 | Spiteri . |
| 3,184,888 | 5/1965 | Furth et al. . |
| 3,185,397 | 5/1965 | Nelson . |
| 3,368,233 | 2/1969 | Hemberger . |

| | | |
|---|---|---|
| 3,594,089 | 7/1971 | Powell . |
| 4,063,750 | 12/1977 | Mutchler . |

(List continued on next page.)

FOREIGN PATENT DOCUMENTS

| | | | |
|---|---|---|---|
| 60812 | 4/1943 | Denmark . | |
| 0058613 | 8/1982 | European Pat. Off. | 47/1.5 |
| 0124672 | 11/1984 | European Pat. Off. | 47/1.5 |

(List continued on next page.)

OTHER PUBLICATIONS

S. M. Batten, "Those Irrepressible, Incredible, Impossible Grassy Weeds!," USGA Green Section Record, Sep.-Oct. 1984, pp. 1-4.

(List continued on next page.)

*Primary Examiner*—Ramon S. Britts
*Assistant Examiner*—Joanne C. Downs
*Attorney, Agent, or Firm*—Arnold, White & Durkee

[57] ABSTRACT

A herbicide applicator has an inclined underside surface supported at a selected elevation and slope with respect to the ground. Liquid herbicide is fed at a variably controlled rate to an upper edge portion of the inclined underside surface, and the herbicide flows down the underside surface without dripping before reaching the lower edge portion of the underside surface. Preferably, the underside surface is provided by a durable, non-absorbent, structural-grade material that has been roughened to increase its liquid storage capacity, for example, by grooves, indentations, or pockets. Preferably, liquid herbicide is uniformly fed to the underside surface by a distributor having a perforated tube and a strip of porous plastic sealed within a channel so that liquid fed to the tube must exit through the pores in the porous plastic strip. Preferably, herbicide is collected at the lower edge portion of the underside surface by a rope-wick or other absorbent material, and any excess is removed by a drain or a suction line. For applying herbicide to a wide swath of vegetation, a number of rigid panels are hinged together, or a wide semi-flexible panel is drawn by draw bars connected to the panel by a network of flexibly-connected braces.

57 Claims, 8 Drawing Sheets

U.S. PATENT DOCUMENTS

| | | |
|---|---|---|
| 4,126,962 | 11/1978 | Polcaro . |
| 4,187,638 | 2/1980 | Hardy et al. . |
| 4,275,970 | 6/1981 | Morrison et al. . |
| 4,285,160 | 8/1987 | Barton et al. .................... 47/1.5 |
| 4,291,491 | 9/1981 | Maddock . |
| 4,305,224 | 12/1981 | Maddock . |
| 4,309,842 | 1/1982 | Jones . |
| 4,320,595 | 3/1982 | McClure et al. ................ 47/1.5 |
| 4,347,010 | 8/1982 | Petkoff . |
| 4,377,920 | 3/1983 | Bowman ........................... 47/1.5 |
| 4,403,881 | 7/1984 | Keeton . |
| 4,468,833 | 9/1984 | Samuelsson . |
| 4,546,570 | 10/1985 | Schaeffer ........................ 47/1.5 |
| 4,597,219 | 7/1986 | Kropf . |
| 4,716,677 | 1/1988 | Moore . |
| 4,908,981 | 3/1990 | Moore . |
| 4,947,580 | 9/1990 | Moore . |
| 4,965,960 | 10/1990 | Moore . |

FOREIGN PATENT DOCUMENTS

| | | |
|---|---|---|
| 1146944 | 5/1957 | France . |
| 2531837 | 2/1984 | France .............................. 47/1.5 |
| 929758 | 7/1955 | Germany . |
| 7807653 | 1/1980 | Netherlands . |
| 94706 | 8/1959 | Norway . |
| 92054 | 4/1938 | Sweden . |
| 452810 | 5/1968 | Switzerland . |
| 812732 | 4/1959 | United Kingdom .......... 47/1.5 |
| 979735 | 1/1965 | United Kingdom . |
| 2120915 | 5/1982 | United Kingdom . |
| 2157935 | 11/1985 | United Kingdom . |
| 2161685 | 1/1986 | United Kingdom .......... 47/1.5 |
| 2180174 | 3/1987 | United Kingdom . |
| 428721 | 10/1974 | U.S.S.R. . |

OTHER PUBLICATIONS

"The New Century Super-7 Wick Bar Applicator," Century Engineering Div., Ex-Cell-O Corp., 221 4th Ave., S.E., Cedar Rapids, Iowa (Jun. 1981) (2 pgs.).

"Wipe Out Weeds with the New, Improved Walk A Wick," (1 pg.).

"Weed Sweep" Herbicide Applicators, Weed Control Systems, P.O. Box 7795, Naples, Fla. 33941, Oct. 1986) (5 pages).

D. E. Walters, "Another Approach to Weed Control," Golf Course Management, Feb. 1986, pp. 22, 26, 28.

"Lawn Care & Liquid Application Accessories," Lesco, 1968, p.20.

"Porex TM Porous Plastics Materials," Porex Technologies, 500 Bohannon Rd., Fairbum, Ga. 30213, 1986 (4 pages).

"Porex Technologies," Porex Technologies, 500 Bohannon Rd., Fairbum, Ga. 30213, 1986 (9 pages).

"Porex TM Porous Plastics Air/Water Flow Charts," Porex Technologies, 500 Bohannon Rd, Fairbum, Ga. 30213, 1986 (2 pages).

"Porex TM Porous Plastics Design Considerations," Porex Technologies, 500 Bohannon Rd., Fairbum, Ga. 30213, 1986 (2 pages).

"Porex TM Porous Plastic Standard Sheet Products," Porex Technologies, 500 Bohannon Rd., Fairbum, Ga. 30213, 1985 (2 pages).

"Porex S40C TM Porous Plastic Tubes," Porex Technologies, 500 Bohannon Rd., Fairbum, Ga. 30213, 1986 (2 pages).

"Porex Proto-Aire TM Materials Handling Sheet", Porex Technologies, 500 Bohannon Rd., Fairbum, Ga. 30213, 1985 (2 pages).

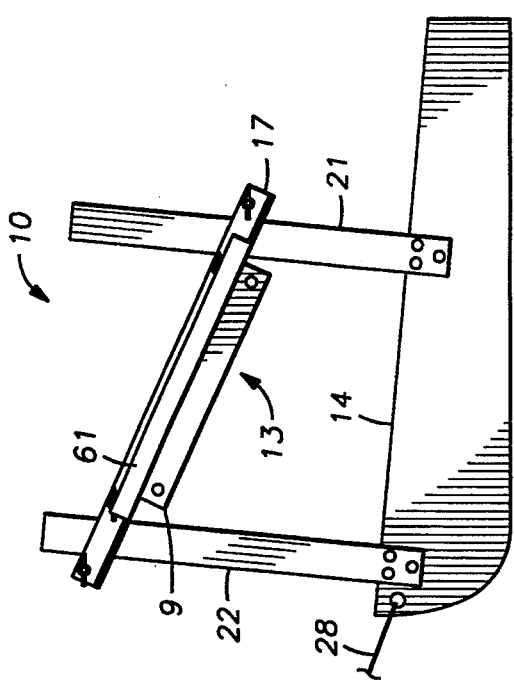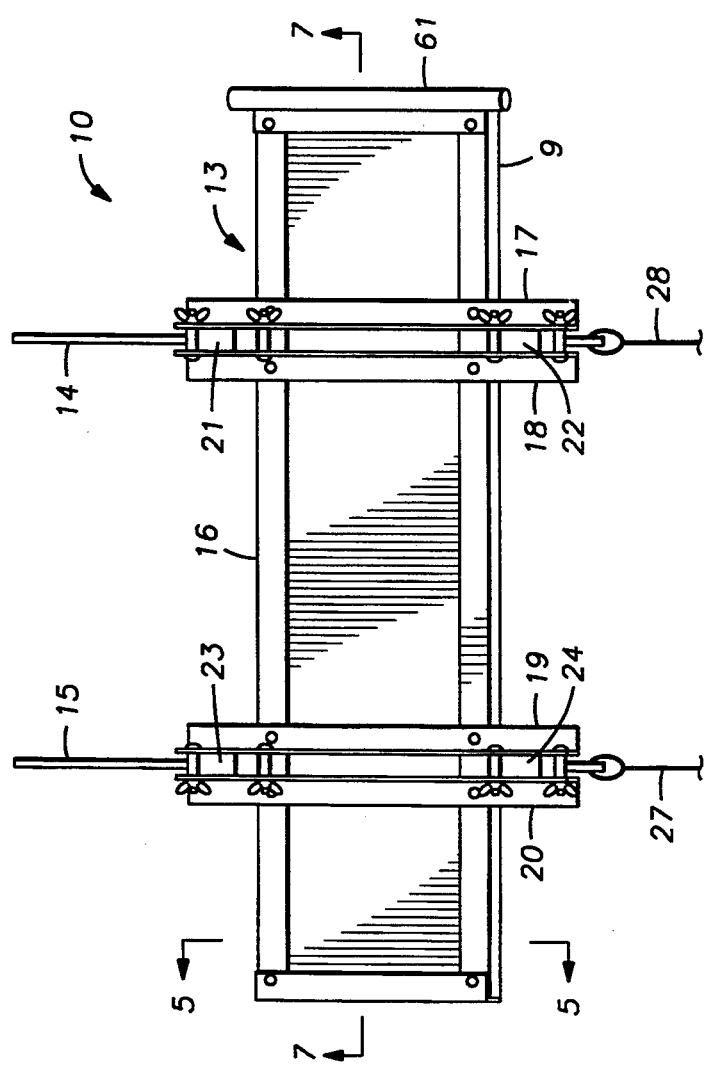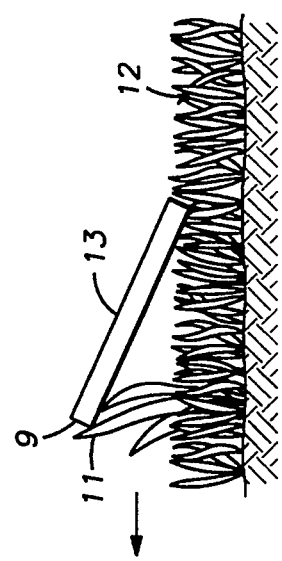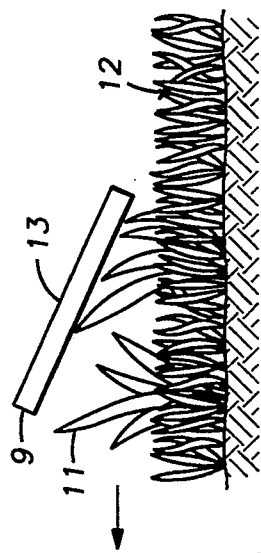
FIG. 2
FIG. 3
FIG. 4A
FIG. 4B

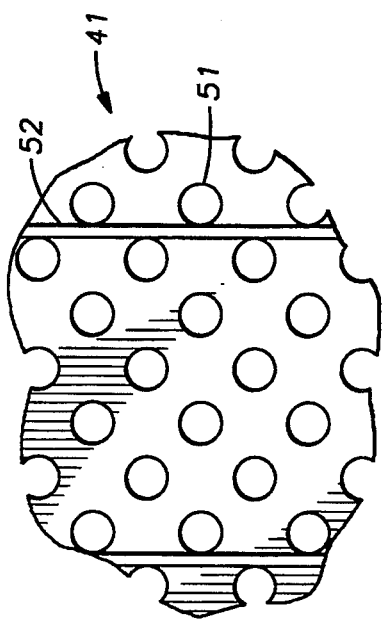
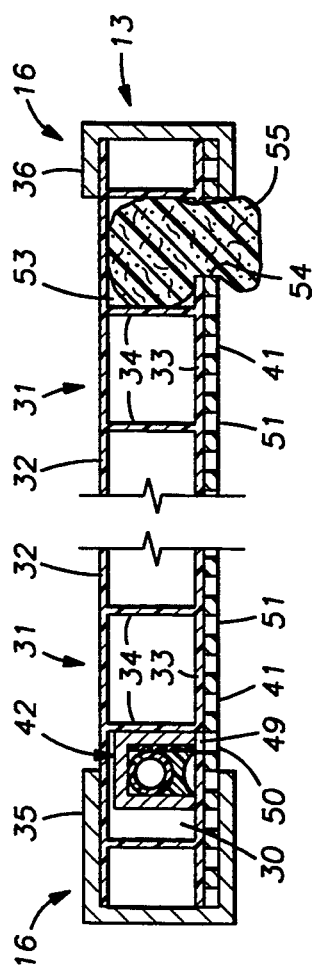
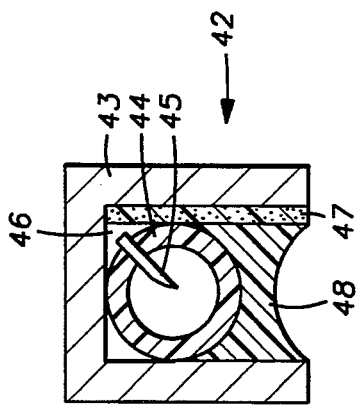
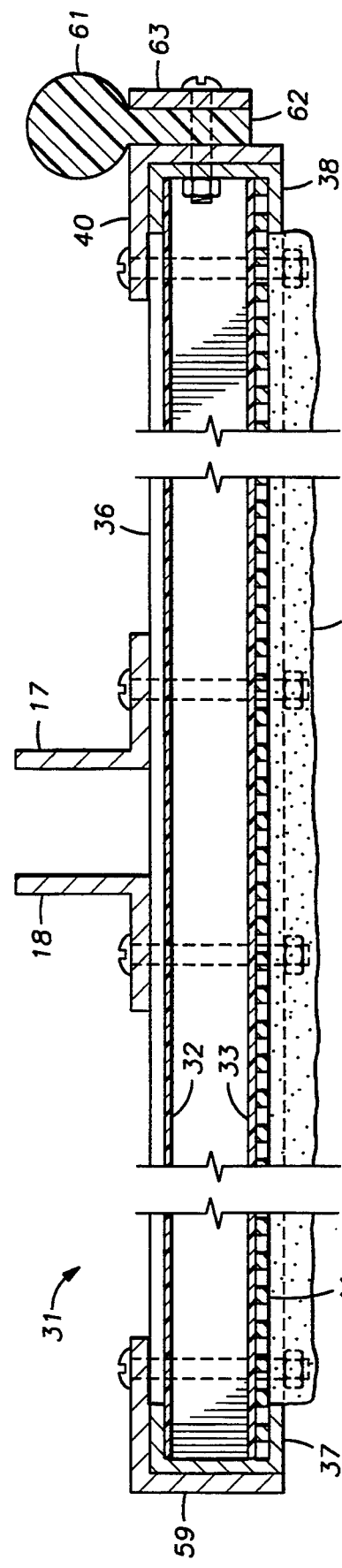

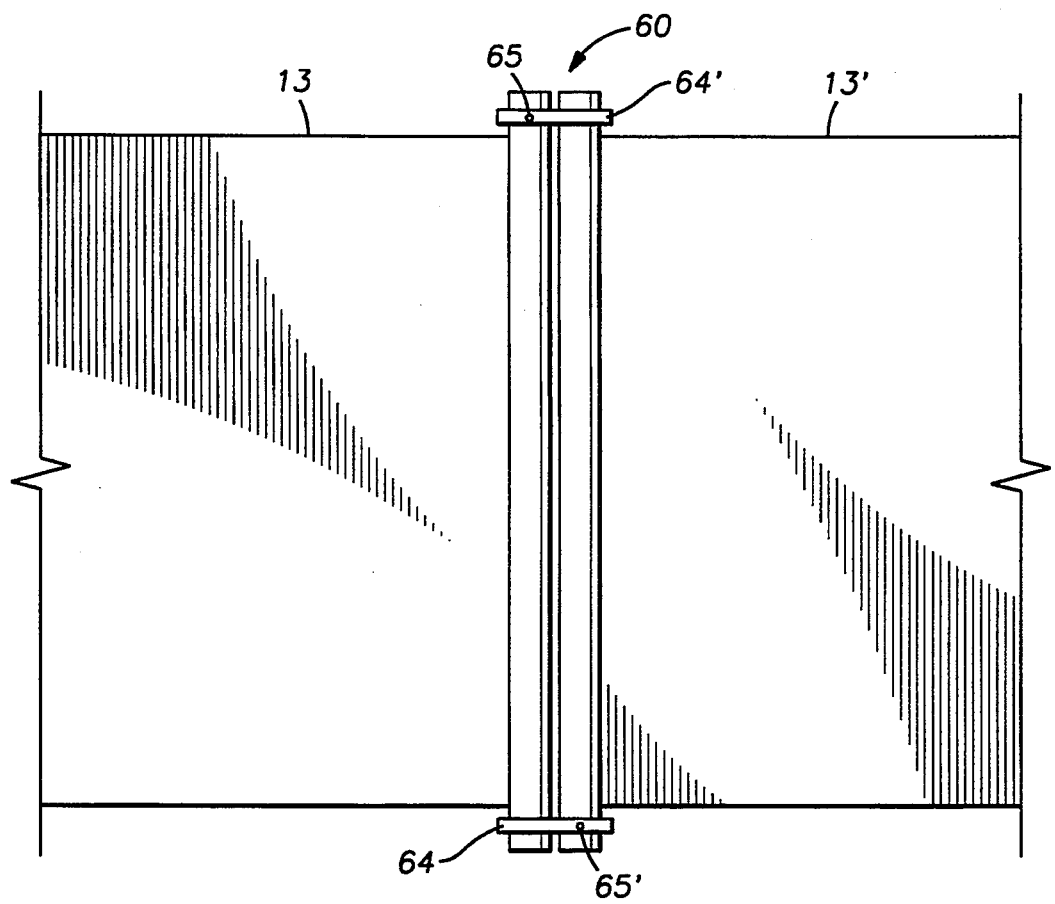
FIG. 9
FIG. 10
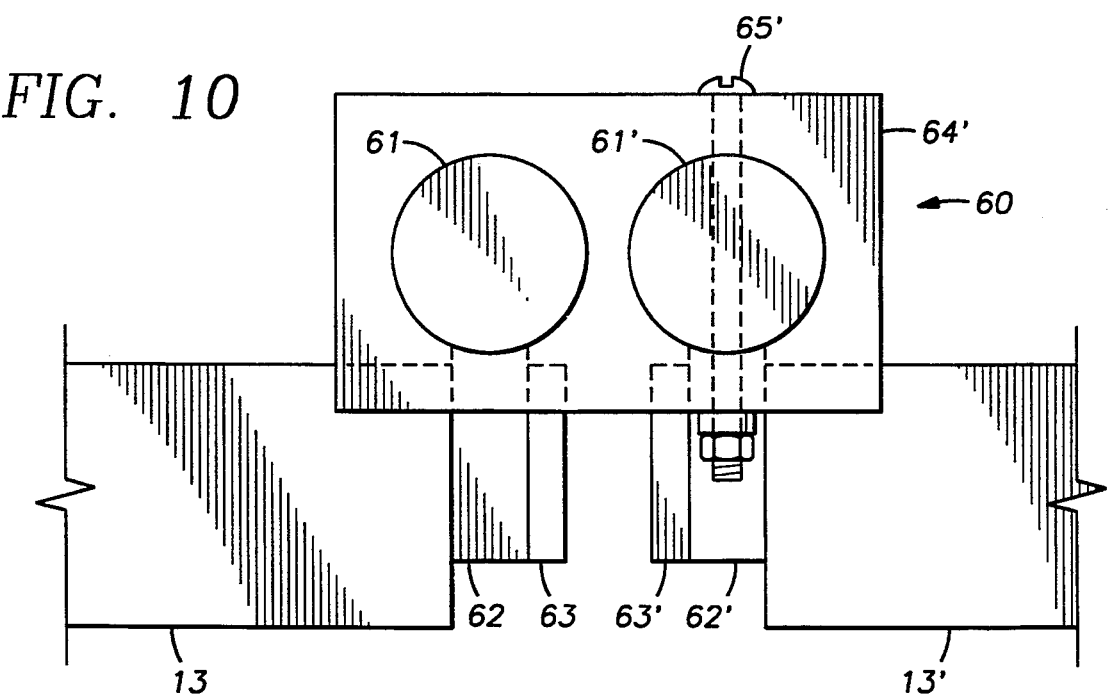

DEVICES AND METHODS FOR SELECTIVE APPLICATION OF HERBICIDE

BACKGROUND OF THE INVENTION

1. Field of the Invention

This invention relates to devices and methods for the direct application of chemical substances to selected plants at specific locations thereon.

2. Background Art

The conventional methods of applying chemical substances to vegetation is by spraying, sprinkling, or sowing highly diluted solutions or mixtures of the chemicals on the whole plant area. Such "broadcast" methods reduce the desired concentration on the specific plants to be treated, increase the cost of chemicals, require the handling and distribution of large volumes of diluents, and subject humans, animals, vegetation, and other objects far removed from the treatment area to the chemicals due to "vaporization," "drift" "translocation," or "leaching".

To avoid the difficulties associated with the broadcast methods, the individual application of chemicals has been made by hand and by mechanical devices to selected plants. Selective application has permitted the use of highly potent but relatively safe non-selective herbicides for the control of weeds and other undesirable vegetation. A preferred kind of non-selective herbicide is a 41% solution of isopropylamine salt of N-(phosphonomethyl) glicine, as further described in U.S. Pat. Nos. 3,799,758 and 4,405,531, and sold under the trademark "ROUNDUP" by the Monsanto Agricultural Company, St. Louis, Mo. 63167.

As disclosed in Laughlin U.S. Pat. No. 2,988,841, mechanical devices have been proposed for the direct application of chemical substances to selected plants at specific locations thereon. An applicator such as a brush or pad is traversed across the area of vegetation at a pre-selected height, speed and angle, so as to produce a treatment zone without affecting underlying vegetation. Such a mechanical device includes height controlling wheels and a push handle or tractive support, or applicator brushes or pads are adjustably mounted on a rake-like structure.

Mechanical devices for the direct application of chemical substances to plants have been manufactured and sold as attachments to tractors, trailers and other vehicles. Hardy et al. U.S. Pat. No. 4,187,638 discloses a rope wick applicator in the form of an elongated pipe having a number of exposed portions of wick protruding from the pipe at spaced locations. Similarly, an applicator has been manufactured and sold by Ex-Cell-O Corporation, Century Engineering Division, Cedar Rapids, Iowa 52401, in the form of an elongated pipe having its lower outer surface covered with a carpet fed with chemical solution. A herbicide wiper consisting of an enclosure containing a series of nozzles that discharges onto a rounded carpeted underside is marketed by the Apple Manufacturing Company, Fort Pierce, Fla. A roller-type applicator covered with a carpet is being sold by Bill D. Wilson, P.O. Box 25, Lutz, Fla. 33549. A variety of other wipers covered with soft materials have been used to apply solutions to vegetation. When "ROUNDUP" is applied with wiping-type applicators, the practice has been to use solutions containing 70–90% water.

My U.S. Pat. No. 4,908,981 discloses an applicator pad for the selective application of herbicide to weeds overgrowing the height of turfgrass. The pad is supported by a skid that slides on the turfgrass. The skid can be oriented to uplift horizontally extending weeds into the path of the applicator pad. The skid is also designed to raise the applicator pad above sections of high ground. Also disclosed are forward bars that divert foreign objects from the path of the applicator.

My related U.S. Pat. 4,965,960 discloses the use of hard, non-spongy, porous materials to provide uniform distribution and application of liquids to vegetation, rather than the soft materials previously used. In some cases, this porous material is used to distribute the liquid to another material that serves as the applicator. A form of porous plastic is used that is dimensionally-stable, durable, and highly abrasion resistant. This material can be readily cut, sawed and drilled to provide liquid distribution channels and various applicator shapes. The porous plastic can be welded and is easily glued to other materials.

Weed control is a problem in a wide variety of locations worldwide. Many millions of dollars and millions of hours are spent annually in controlling weeds. Weed control methods include mechanical mowing, scalping, deep-set vertical mowing, hand removal, hoeing, excavation, turning off irrigation, starvation by eliminating normal fertilization, and spraying or wiping with herbicides and other chemicals.

The eradication of weeds growing above valuable vegetation, such as crops, lawns and grazing lands, is particularly difficult to accomplish without damaging the desirable vegetation. Such weed control is especially difficult when the weeds are massive or growing in large clumps or patches. Methods of controlling such weeds include spraying the weed-infested area with selective herbicides. Also, wipers have been used to apply non-selective herbicides onto the portions of the weeds that extended well above underlying desirable vegetation; however, this method has not always proved to be satisfactory, due to the inability to apply sufficient herbicide to the weeds without having the herbicide drip onto and damage the underlying vegetation.

A practice often associated with weed control is that of limiting the vertical growth of grasses that are used as ground cover. The common method is to mechanically mow the area when either the weeds or the grasses or both become too tall. Mechanical mowing is carried out in maintaining areas such as lawns, playing fields, parks and airports, and in preventing soil erosion beside highways, in orchards, groves and vineyards, and elsewhere. Another method that is practiced on a limited scale in some locations is to "chemically mow" the vegetation by spraying it with a highly diluted solution of a growth-retarding herbicide. This method usually does not completely eliminate the weeds nor the need for mechanical mowing.

Another related practice is to eliminate all vegetation growing under trees, between rows of crops, and in other locations. In some cases, the undesired vegetation is removed by mechanical means such as plowing. Another common method is to spray the area to be treated with potent herbicides. This inefficient method is expensive and usually results in at least some damage to nearby valuable vegetation or its fruit. Herbicide wipers are also used to a limited extent, but these have not been accurate enough, and the wipers tend to become contaminated with dirt, which reacts with and reduces the effectiveness of products such as the "ROUNDUP" brand of herbicide.

SUMMARY OF THE INVENTION

The primary object of the present invention is to provide a liquid herbicide applicator assembly which can store a large quantity of liquid at the applicator wiping surface, where it is readily available for wiping onto any vegetation contacted by that surface. A related object is to provide means for preventing any excess of such liquid fed to said surface from dripping onto vegetation growing below the elevation at which the applicator is supported.

Another object of the invention is to provide a broad applicator surface that is oriented so that it can wipe liquid on all vegetation growing within a broad vertical application zone. A related object is to feed liquid to the applicator and to orient its active surface in such a manner that the taller the plants contacted are, the more liquid they receive. Another object is to orient the applicator wiping surfaces so that liquid is applied to unexposed vegetation, such as interior blades of thin-bladed grasses that grow in tall, dense bunches and have multiple root systems. Another specific object is to enable the applicator to be used to simultaneously kill tall plants contacted while only retarding the growth of the lower-growing vegetation contacted.

Another object of the invention is to provide a herbicide applicator that is capable of wiping herbicide on all plants growing in the area to be treated, while keeping the contact between the herbicide and the ground at the absolute minimum. Related objects are to keep the profile of the applicator as low as practicable to minimize its contact with overhanging, low-growing desirable vegetation, and to fully shield the herbicide-coated wiping surfaces to prevent their contact with the desirable vegetation.

Still another object of the invention is to provide an application system having a self-contained supply of herbicide sufficient for several hours of operation at a rate of five to ten miles per hour. A related object is to provide a complete application system that can utilize efficiently a very highly concentrated herbicide solution, in order to minimize the quantity of liquid to be handled.

Another related object is to provide a precise means of regulating the liquid feed rate to the active surface of the herbicide applicator within a wide range of application rates. Yet another object is to insure uniform transverse distribution of the herbicide to and upon the applicator wiping surface, especially during operation over sloping terrain.

Still another object of the invention is to provide a herbicide assembly that is either flexible or consists of sections that are hinged together and independently supported, so that the wiping surfaces will remain approximately at a uniform height above the ground while the assembly traverses uneven terrain, such as swales, ridges and ditch banks.

And still another object of the invention is to provide highly durable herbicide applicator assemblies, which can be used under severe conditions without being damaged, by using standard, commercially-available, structural shapes, such as sheets, angles, and channels of metal and plastic, not only for the structural members but also to provide the applicator surfaces.

Briefly, in accordance with a primary aspect of the present invention, a herbicide applicator has an inclined underside surface supported at a selected elevation and slope with respect to the ground. Liquid herbicide is fed at a variably controlled rate to an upper edge portion of the inclined underside surface, and the herbicide flows down the underside surface without dripping before reaching the lower edge portion of the underside surface.

For treating clumped or irregularly spaced vegetation, the underside surface preferably is roughened to increase its liquid storage capacity, for example, by grooves, indentations, or pockets, and therefore the underside surface can apply large amounts of herbicide at a variable rate while being fed with herbicide at a constant rate. For sloping terrain, the underside surface may be provided with grooves in a direction perpendicular to the slope of the terrain to ensure more uniform distribution of the herbicide.

Preferably, liquid herbicide is uniformly fed to the underside surface by a distributor having a perforated tube and a strip of porous plastic sealed within a channel so that liquid fed to the tube must exit through the pores in the porous plastic strip.

When applying herbicide to plants extending above desired vegetation, herbicide is collected at the lower edge portion of the underside surface by a rope-wick or other absorbent material, and any excess is removed by a drain or a suction line.

For applying herbicide to a wide swath of vegetation, a number of rigid panels are hinged together, or a wide flexible panel is drawn by draw bars connected to the panel by a network of flexibly-connected braces.

BRIEF DESCRIPTION OF THE DRAWINGS

Other objects and advantages of the invention will become apparent upon reading the following detailed description and upon reference to the drawings, in which:

FIG. 1 is a perspective view showing a preferred embodiment of a light-weight herbicide applicator assembly according to the present invention being supported on the ground and drawn by a utility vehicle;

FIG. 2 is a plan view of the applicator assembly shown in FIG. 1;

FIG. 3 is a side view of the applicator assembly shown in FIG. 1;

FIG. 4*a* and 4*b* are stop motion views of the herbicide applicator panel shown in FIG. 1, while treating vegetation in two typical modes;

FIG. 5 is a cross section view along line 5—5 in FIG. 2;

FIG. 6 is a portion of FIG. 5 showing details of the liquid distributor for the applicator assembly shown in FIG. 1;

FIG. 7 is a cross-section view along line 7—7 in FIG. 2;

FIG. 8 is a detailed view showing a typical portion of the underside wiping surface of the applicator assembly shown in FIG. 1;

FIG. 9 is a portion of a plan view similar to FIG. 2 showing a method of connecting two applicator assemblies together by hinges;

FIG. 10 is a side view showing additional details of the hinges shown in FIG. 9;

FIG. 11 is a cross sectional side view showing a much simplified version of a herbicide applicator assembly equipped to be supported by a utility vehicle;

FIG. 12 is an enlarged, detailed view of a distributor shown in FIG. 11;

FIG. 13 is a cross sectional view showing modifications and additions to the applicator shown in FIG. 11;

Figure 1:
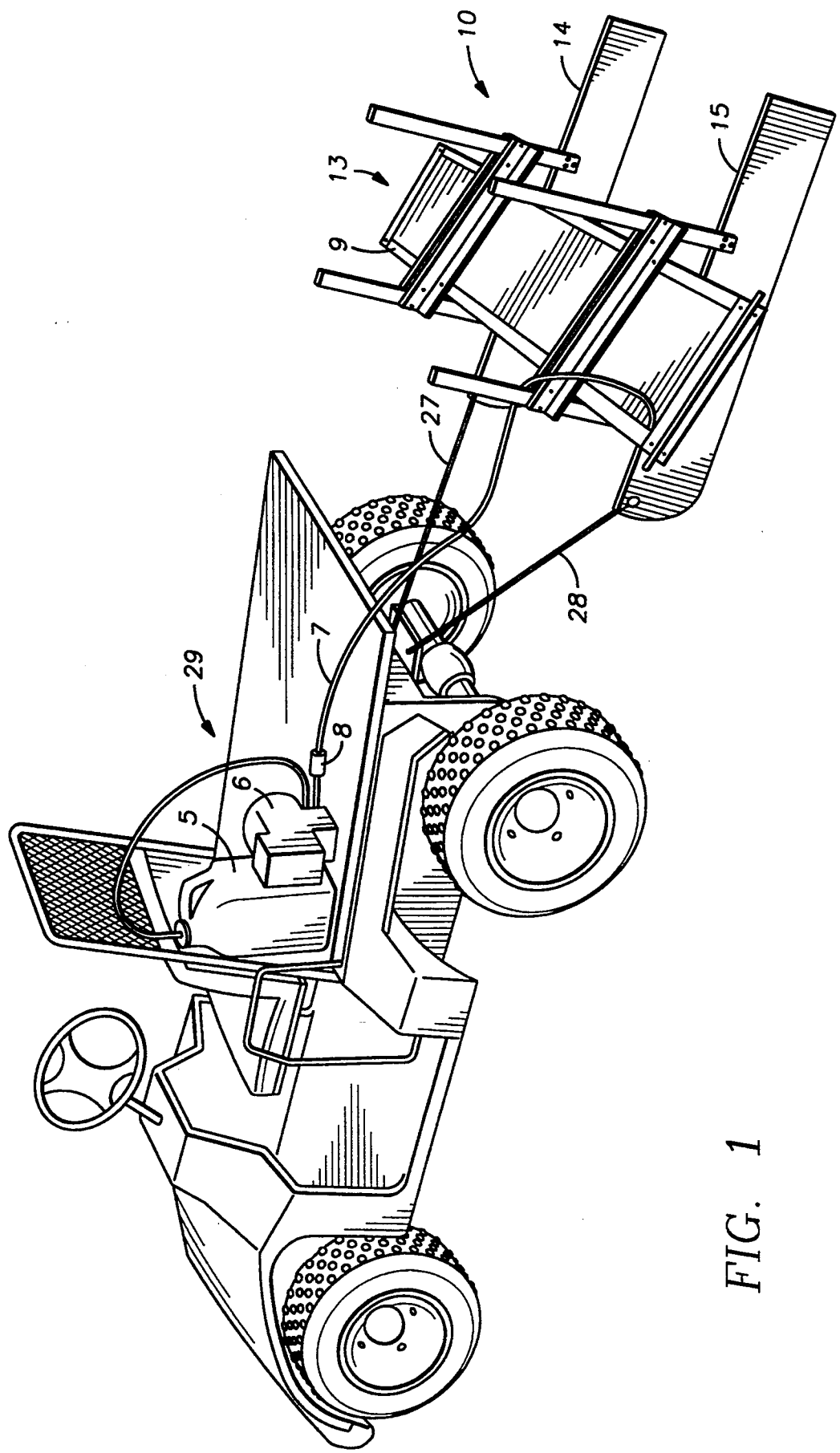

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives defined by the appended claims.

DETAILED DESCRIPTION OF THE PREFERRED EMBODIMENTS

Turning now to the drawings, there is shown in FIG. 1 a very light-weight herbicide applicator assembly generally designated 10 according to an important aspect of the invention. Liquid herbicide is applied to vegetation by an inclined applicator panel 13 supported at a precise angle and height above the ground by a pair of runners generally designated 14, 15 and drawn by a vehicle 29. The herbicide is pumped from a container 5 by a metering pump 6, both of which are carried by the vehicle, then via a feed tube 7, which has an in-line filter 8, to a distributor (42 in FIGS. 5 and 6), which discharges the herbicide along the leading edge 9 of the panel 13. The liquid herbicide then flows down the sloping underside of the panel, which wipes the herbicide onto targeted plants.

For drawing the assembly 10, two cables 27, 28 connect the two runners 14 and 15 to the vehicle 29, which could be any kind of vehicle that is suitable for the terrain, as shown in FIG. 1. A number of applicator units, such as the assembly 10 shown, could be drawn simultaneously by the same vehicle 29 in ganged fashion as is common for horizontal reel-type mowers. For example, three assemblies might be connected to the vehicle, one at the rear, and the others to bars extending from the two sides. In any case, the arrangement should provide for complete coverage of the swath to be treated without substantial overlapping. In a second arrangement, two or more assemblies can be connected to one another by hinges and be pulled as a unit. Six skids are required for three sections in the first arrangement, whereas, only four are needed in the second arrangement.

The applicator assembly 10 can be used to apply herbicides in at least two modes. In the first mode, which is illustrated in FIG. 4a, undesired vegetation 11, such as weeds, is killed, while the underlying vegetation 12, such as a commercial crop, remains completely untreated. In order to selectively apply the herbicide to weeds 11 growing above crops 12, the inclined panel 13 is set at a safe height above the crop 12, and applicator panel 13 is pulled in a longitudinal direction so that the underside of the panel wipes only the portions of the weeds that extend above the crop.

In the second mode (FIG. 4b), the panel operates at a lower elevation than in the first mode, so that both the weeds 11 and the underlying vegetation 12, are treated. Since the liquid is fed along the uppermost, leading edge 9 of the underside of the applicator panel, the taller weeds 11 can receive enough of the herbicide to be killed while the underlying vegetation 12 receives just enough to be retarded ("chemically mowed"). To accomplish this, the panel 13 is set at the optimum degree of inclination and height above the ground to cover the predetermined treatment zone, and the herbicide feed rate and vehicle speed are properly adjusted, all based on the practical experience of the operator.

As shown in FIGS. 2 and 3, the applicator assembly 10 includes an inclined panel 13 having a frame 16, two pairs of clamping bars 17, 18, 19, 20, two pairs of supporting legs 21, 22, 23, 24, and two runners 14, 15. The structural members are preferably made of conventional aluminum extrusions. Each runner 14, 15 slides on the ground and preferably is made of highly abrasion-resistant, ultra-high-molecular-weight polyethylene (UHMW PE). Stainless steel fasteners are used throughout, although some of the parts can be welded or riveted together.

Turning to FIGS. 5–8, the inclined-panel applicator 13 is shown in further detail. As shown in FIG. 5, the extremely light-weight panel body 31 consists of a twin-wall sheet of polycarbonate or other plastic, having an upper wall 32, a lower wall 33, and a multiplicity of equally-spaced connecting webs 34 that form transverse channels. As further shown in FIG. 7, the frame 16 holding the panel-body 31 is formed by aluminum channels 35, 36, 37, 38, which are bolted to aluminum angles 59, 40. The two pairs of clamps 17, 18 (FIG. 7), and 19, 20 (FIG. 2) are bolted to the front and rear channels 35, 36.

As shown in FIG. 5, the front channel 30 of the twin-wall sheet 31 houses the liquid distribution cartridge 42 and has a narrow outlet slot 49 cut in the rearmost portion of its lower wall 33. The rearmost channel 53 of the twin-wall sheet has a wide slot 54 cut in its lower wall, and an oversize rope-wick 55 is wedged into the channel so that a portion protrudes from the channel. A perforated sheet 41 of plastic is cut and fitted so that it covers the underside of the twin-wall sheet 31, presses against the rope-wick 55, and has a row of openings 50 directly under the slot 49 in the twin-wall sheet. The two sheets are then glued to one another and clamped together by the frame 16. A minimum of glue is used, so that the pockets 51 formed by the two sheets are not partially filled with glue. Pop rivets (not shown) could also be used to help secure the two sheets to one another.

As shown in FIG. 6, the replaceable distributor 42 includes: an aluminum channel 43, which contains a distribution tube 44; a distribution channel 46; a number of hypodermic needles 45, which are inserted through the wall of the tube 44 so as to discharge into the channel 46; a flow restrictor 47 consisting of a thin strip of porous plastic; and a seal 48 of silicone caulk. In some cases, small holes in the sidewall of the distribution tube 44 can be used instead of the needles 45. This use of porous plastic is a subject of my U.S. Pat. No. 4,965,960, incorporated herein by reference.

FIG. 8 shows an arrangement of the perforations 51 and the grooves 52 in the underside of the perforated sheet 41. The size, spacing, and arrangement of the pockets 51 formed by the perforated sheet 41 and the sheet 31 to which it is glued, are important with regard to their capabilities of receiving, storing, and retaining liquid when being wiped by the vegetation and during rough handling or operation on steeply sloping terrain. Although the optimum criteria might need to be determined for each intended use, the following have proved to be satisfactory to date: pockets 0.125" diameter and 0.125" deep, spaced on 0.19" staggered centers, providing 33 holes per square inch of surface area and 40% open area.

The grooves 52 cut in the underside of the perforated sheet can be oriented vertically, horizontally, or diagonally, as required to help maintain uniform distribution of the liquid as it flows down the underside. This is a particularly important consideration with regard to applicators that are to be operated on sloping terrain or that are to be tilted from time to time.

The liquid flow during the operation of the inclined-panel applicator assembly 10 is summarized as follows: The liquid entering the distributor 42 from the feed tube 7 flows consecutively through the distribution tube 44, the hypodermic needles 45, the distribution channel 46, the porous strip 47, the slot 49, the openings 50, and down the underside of the perforated sheet 41, which wipes it onto the targeted plants 11 and/or 12. The plants wiped by the underside of the sheet tend to spread the liquid on the underside of the sheet 41, into and out of the pockets 51 and grooves 52, and onto the rope-wick 55. Longitudinal and/or transverse slots or grooves 52 cut in the lower surface of the perforated sheet 41 help direct the flow down the underside of the sheet 41 and increase the liquid storage capacity of the sheet. The rope-wick 55 serves as a collector of excess liquid which in its absence would have dripped, as a re-distributor of the liquid, and as an applicator. The rope-wick also can serve as an indicator of excess liquid being fed to the assembly, since too much wetness of the rope-wick is an indication that the feed rate is too high.

As the inclined panel is drawn over a swath of vegetation, the taller the treated plants are, the more contact they have with the panel. Also, since the liquid is fed to the panel along the leading, upper edge of the underside surface, the incoming liquid comes in contact with the taller plants first. As a result, the taller the plants are, the more liquid they receive. Therefore, it is a relatively simple matter of judgement by the operator to select and control the height of application, the herbicide feed rate, and the speed of travel, so that tall weeds are killed, while the rate of growth of the lower-growing vegetation is only retarded.

This method of applying herbicide to vegetation using the inclined panel has proved to be so efficient that the amount of water needed to be added to the "ROUNDUP" brand of herbicide as an aid in its distribution has been drastically reduced. The indications are that undiluted "ROUNDUP" brand of herbicide could be the best concentration to be used with the inclined panel for most applications. When compared with the spraying of a 1% solution, the amount of liquid to be transported, handled, and applied is reduced by 99%; the product can be pumped directly from its original container rather than a large tank; the many problems that are encountered with the use of water are eliminated; and no mixing, storage or disposal of unused solutions is required. Also, in comparison with most other wiping-type applicators, which typically use 10–30% solutions of "ROUNDUP" brand of herbicide, the liquid volume is reduced by 70–90%.

Another apparent advantage of using "ROUNDUP" brand herbicide without the addition of water is that it has a viscosity and adhesiveness similar to that of light-weight motor oil, which causes it to flow slowly down the underside of the panel and to cling so tightly to the surface of the panel and the pockets and grooves that it is very difficult to be completely wiped off. Consequently, the panel can retain an effective supply of the concentrated herbicide while the plants continue to receive only enough to be retarded or killed, as intended. If a diluent is desired, then it might be advantageous for the diluent to have a viscosity similar to that of "ROUNDUP" brand herbicide.

In weed-killing-chemical-mowing tests of an inclined panel applicator on rank growths of weeds and grasses in citrus groves that were in need of their customary mechanical mowing, an economical 20 ounces of undiluted "ROUNDUP" brand herbicide per acre was applied to 8-foot-wide swaths several miles in length. At the end of each run, the herbicide feed was turned off and swaths measuring half a mile in length were treated with only the liquid remaining on the underside of the panel, after which the underside still retained a coating of herbicide. In subsequent evaluations, the results were satisfactory for all of the tests and apparently undiminished during the periods in which no liquid was fed.

Turning to FIGS. 9–10 and also referring to FIGS. 2 and 7, a method is shown for connecting two or more complete applicator assemblies together by a hinge assembly 60. A commercially-available "dogbone-shaped", UHMW PE strip is cut into two identical pieces to form the two hinge bodies consisting of rounded portions 61, 61' and flat portions 62, 62' which are reinforced by two metal bars 63, 63' and bolted to the frames of two applicator panels 13, 13'. The panels are then connected together by two UHMW PE links 64, 64' which are fitted onto the rounded ends 61, 61' and then secured in place by screws 65, 65'.

Figure 12:
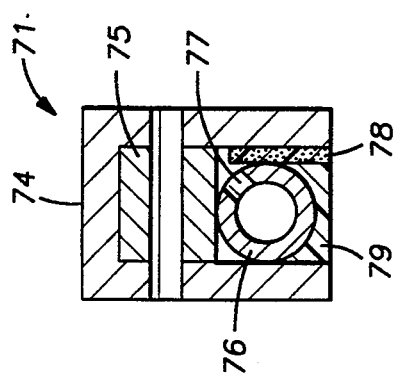
Figure 11:
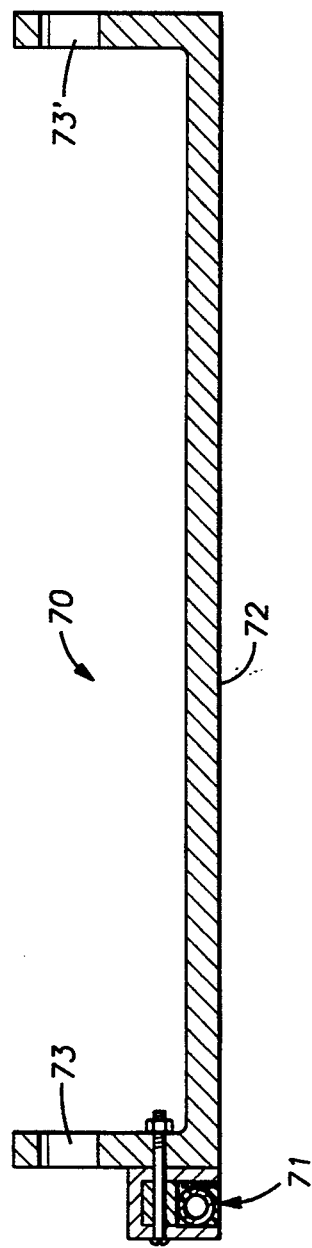

Turning now to FIGS. 11–14, there are shown two heavy-duty herbicide applicators that are designed to be supported from a utility vehicle by either hangers or skids. Applicators of this type can be fabricated from standard high-strength, structural-grade, aluminum shapes. FIG. 11 shows details of an applicator 70, having a wiping surface twelve inches wide, which is capable of spanning a swath of at least 25 feet without appreciable bending. This applicator 70 includes a standard 12" channel 72 that has two pairs of holes 73, 73' through which supporting rods can be inserted, in a manner shown in FIG. 14. A replaceable distributor cartridge 71 is fastened to the leading edge of the channel 72, so that its lower surface is flush with the underside of the channel. As shown in FIG. 12, the distributor 71 consists of a housing channel 74, a filler bar 75, a distribution tube 76 having a series of discharge openings 77, a porous plastic flow restrictor 78 and silicone caulk 79. In operation, the assembly 70 is tilted so that the liquid from the distributor 71 flows down the underside of the channel 72.

Figure 13:
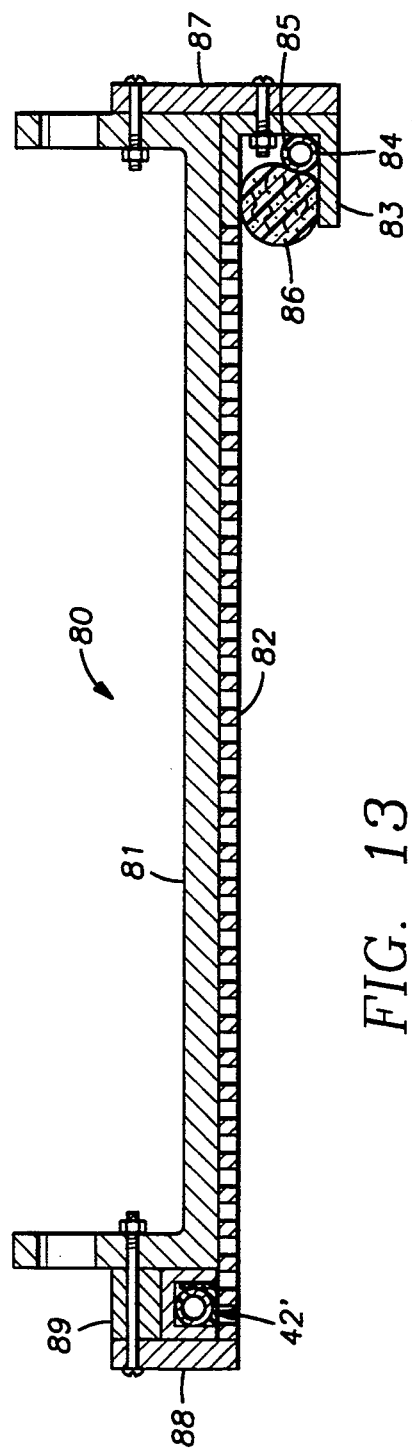

Since the underside surface 72 of the applicator shown in FIG. 12 is smooth, it has a limited capacity for storing liquid not promptly wiped off by the vegetation being treated. In some cases this is desirable; however, in most cases, it is preferable for excess liquid to be stored on the underside of the applicator, since the liquid usually is fed at a constant rate while being wiped off at irregular rates by vegetation growing in nonuniform patterns and heights. The liquid holding capacity of the applicator underside can be increased by scarifying, sand blasting, cutting grooves, or punching cavities. However, a preferred method of increasing the liquid holding capacity is to provide a pocketed surface, as shown in FIG. 13. In this case, the pockets are provided by sealing and fastening a perforated metal or plastic sheet 82 to the underside surface, so that the perforated sheet becomes the wiping surface. In this case, the distributor 42' discharges onto the top of the leading portion of the perforated sheet 82, and a clamping bar 88 extends downward to protect the edge. The clamping bar 88 and spacer 89 also protect the distributor from damage. Details of the distributor 42' are shown in FIG. 6.

The applicator 80 shown in FIG. 13 also includes a combination drip collector and wiper. This added feature includes an aluminum channel 83 containing a rope-wick 86 and a collection tube 84. Channel 88 is bolted to a bar 87, which in turn is bolted to the side of channel 80. The rope-wick 86 serves as both a wiper and a filter to prevent inlet holes 85 in the tube 84 from becoming plugged. The drip collector is particularly useful when the applicator is used to kill weeds growing above valuable crops. The collector may be equipped with two drains, one at each end of the tube 84, for discharging the liquid collected to the ground between plants. Alternatively, both ends of the tube 84 could be connected to a suction port of a pump (not shown) which could return the used liquid and entrapped air to a collection tank (not shown) on the vehicle (91 in FIG. 14) pulling the applicator 80. The collected liquid could be filtered and recycled.

Figure 14:
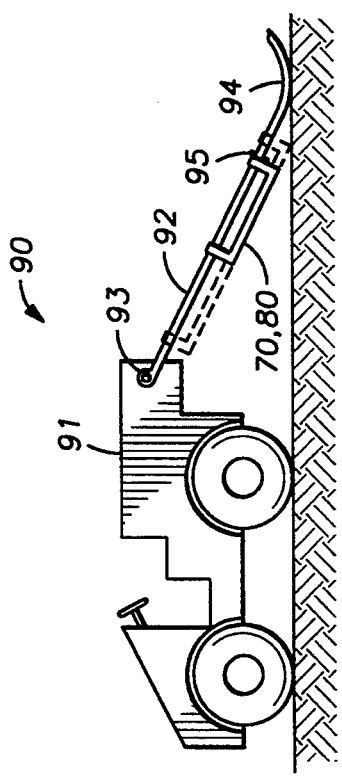
FIG. 14 is a sketch showing an applicator assembly similar to those shown in FIGS. 11 and 12 being supported by both a utility vehicle and the ground.

FIG. 14 shows an assembly generally designated 90, in which either of the applicators 70 or 80 is supported by a pair of rods 92 secured at a selected elevation by a respective pin 95 through each of the two rods 92. The upper ends of the two rods 92 are connected to and supported by the vehicle 91 by swivel joints 93, and the rods 92 have curved lower ends 94 are protected by UHMW PE sheaths that slide on the ground.

Figure 15:
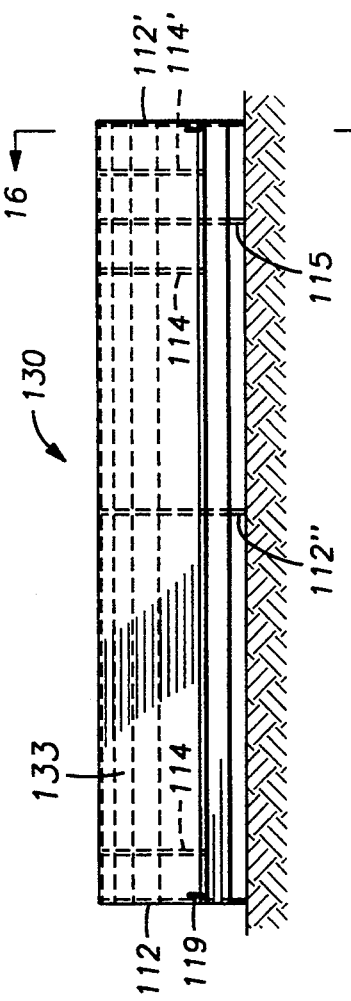
FIG. 15 is an elevation view of a herbicide applicator that is designed to be used to kill all vegetation growing beneath low-growing branches of trees or other plants.
Figure 16:
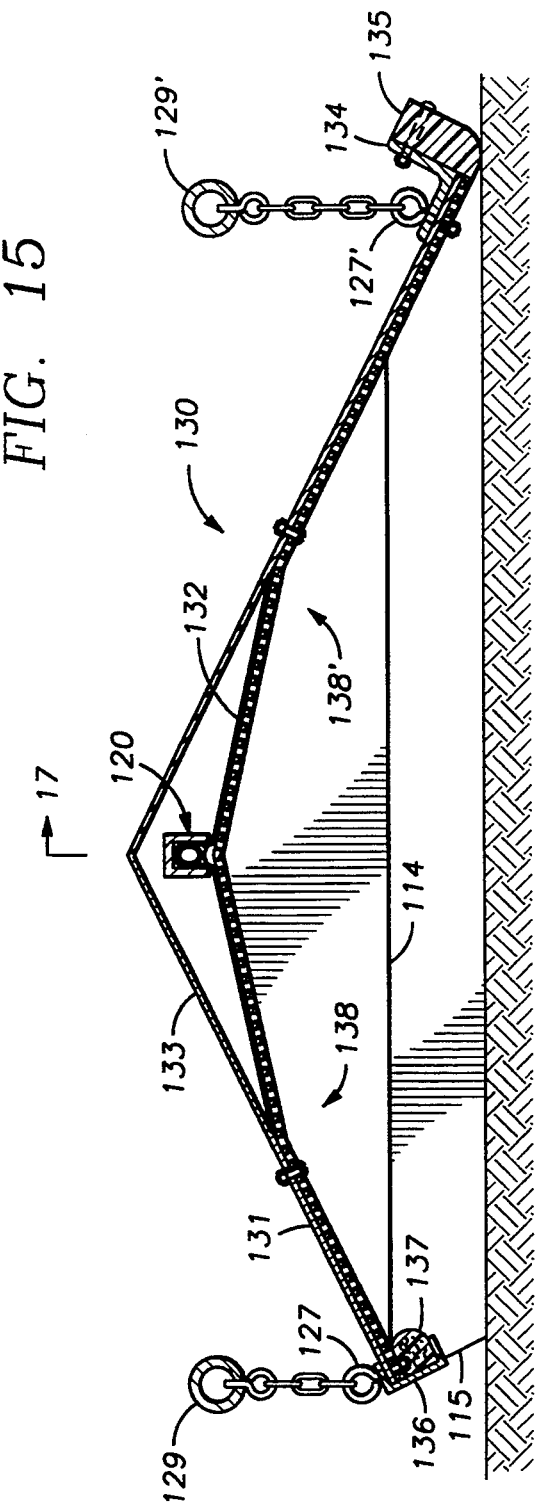
FIG. 16 is a cross sectional view along line 16—16 in FIG. 15.
Figure 17:
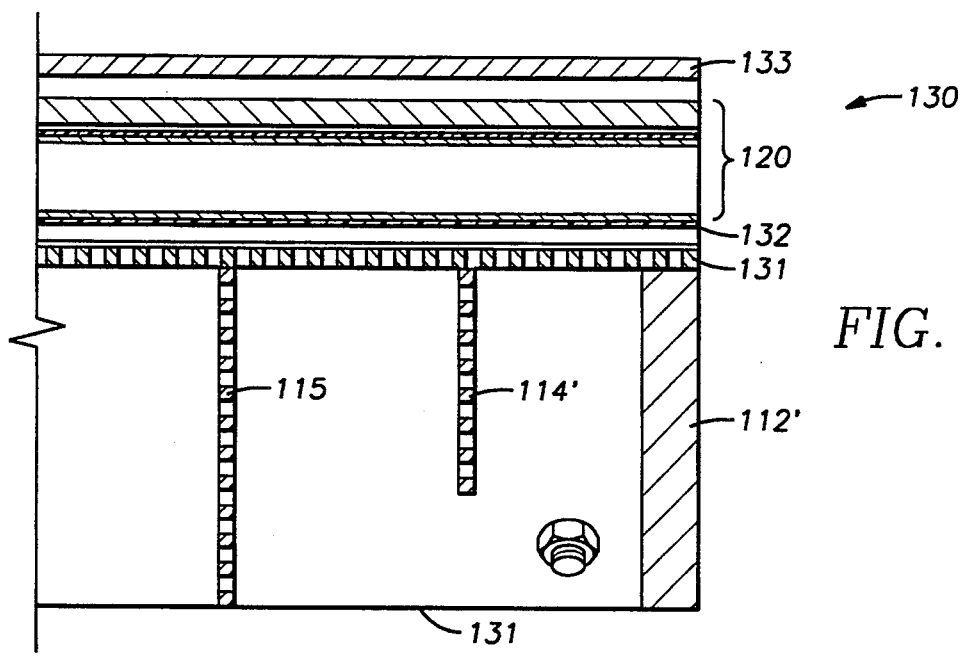
FIG. 17 is a cross-sectional view along line 17—17 in FIG. 16 showing details of optional vertical applicator surfaces in the interior portion of the applicator.

Turning now to FIGS. 15 to 17, there is shown a herbicide applicator 130 especially designed for killing large clumps of vegetation and vegetation including various sizes of plants, such as short and tall plants, and wide and narrow plants. The applicator 130 is fabricated from sheets of aluminum, or other structurally-strong materials, which are bent to form an "A-frame"-shaped structure.

As shown in FIG. 16, the applicator 130 is designed to rest on the ground and be pulled by the arms 129, 129' from a vehicle (not shown). The arms 129, 129' are linked to respective eye bolts 127. 127'. A perforated applicator plate 131 of the applicator 130 is cemented directly to the outer covering 133, with a gap allowed at the top for insertion of the distributor 120'. The perforated plate 131 is bent to form two opposed and inclined applicator panels 138, 138'. The portion of the perforated plate 131 not glued to the outer covering 131 can be covered by a thin sheet of porous plastic 132, as described above. The leading edge of the applicator 130 has a UHMW PE skid bar 135 that is fastened to the unit by angle 134. The trailing edge is equipped with a rope-wick collector-wiper 137 that is held in place by channel 136.

For wiping plants of all sizes with herbicide, the applicator 130 includes any number of supports or baffles 114, 115 arranged approximately vertically and approximately perpendicular to both of the applicator panels 138, 138'. The baffles are welded or screwed to the perforated plate 131. The baffles have different heights and spacings so as to penetrate unwanted clumps of vegetation. The heights of the individual baffles and the spacings between the individual baffles vary in patterns intended to cause plants of all sizes and shapes of plants, tall and short, wide and narrow, to receive as much herbicide as practicable. Preferably, the baffles are made of perforated metal for storage of an amount of the herbicide, and they are installed in contact with the applicator panels 138, 138' to receive a portion of the liquid herbicide fed from the distributor 120.

FIG. 17 shows additional details concerning portions of the applicator 130, including the outer covering 133, the distributor 120', the perforated plate 131 and its porous plastic covering 132, one of the end supports 112, and two optional perforated baffles 114', 115 The vertical members 112', 114', 115 provide additional applicator surfaces and liquid storage capacity to supplement those provided by the sloping applicator surfaces 131. The spacing and heights of the baffles should be chosen depending on the physical characteristics of the vegetation being treated. With this arrangement, the applicator 130 can wipe the sides, as well as the tops of weeds. Also, the vertical baffles can penetrate unwanted clumps of vegetation and apply herbicide to the tall, narrow, interior blades of bunches of grasses having multiple root systems, such as smuttgrass and guinea grass.

Figure 18:
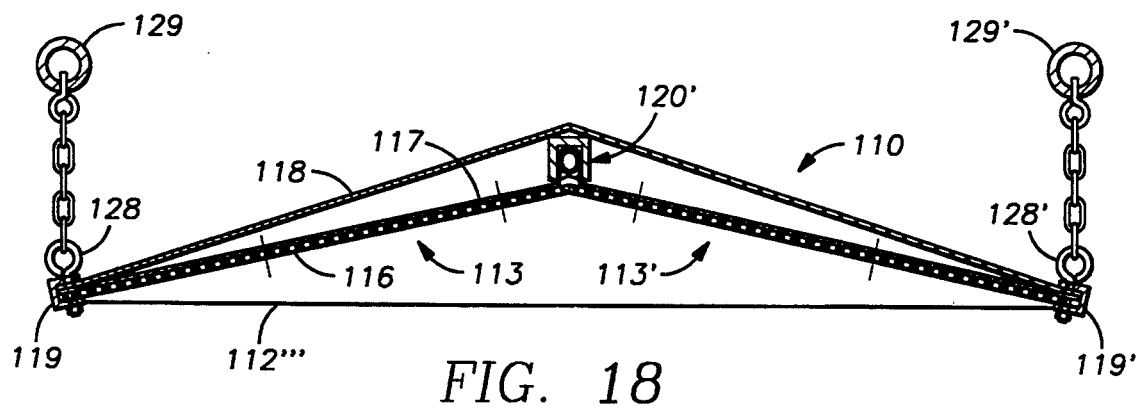
FIG. 18 is a cross sectional view of an alternative low-profile applicator similar to the applicator shown in FIGS. 15 and 16 but having modifications shown by comparison to the cross-section in FIG. 16.

Referring now to FIG. 18, there is shown an alternative applicator 110 that is similar to the applicator 130 of FIGS. 15 to 17, but which has a different profile as seen by comparing FIG. 18 to FIG. 16. The applicator 110 has an extremely low profile, and it is designed for killing all vegetation growing beneath low-growing branches of trees. The applicator 110 may also be used to kill and/or retard the growth of vegetation in other locations. The applicator 110, for example, can also be used to kill massive growths of weeds, such as bermuda grass, that extend only slightly above crops, such as peanut forage.

The applicator 110 is also designed to be supported from the arms 129, 129' extending from the side of a vehicle (not shown). The applicator 110 has outer covering 118 and a perforated applicator plate 116 that forms opposed applicator panels 113, 113' and that can be made of aluminum, clamped together by aluminum channels 119, 119', and secured by eye bolts 128, 128'. Because of its slight slope, the perforated plate 116 may be covered with a thin, porous-plastic sheet 117, which can aid in spreading the herbicide fed to it by a replaceable distributor 120'. The applicator assembly can be made more rugged by fastening the perforated sheet 116 to one or more baffles 112"" by welds or screws.

Figure 19:
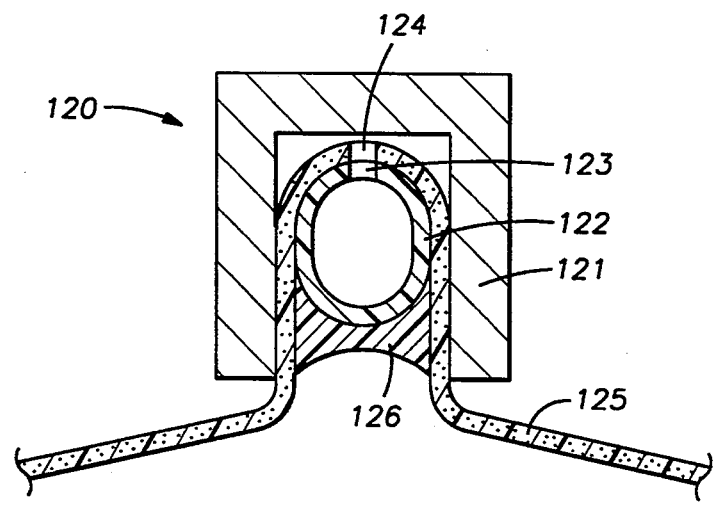
FIG. 19 is an enlarged, detailed cross sectional view of the distributor shown in FIGS. 16 and 17.
Figure 20:
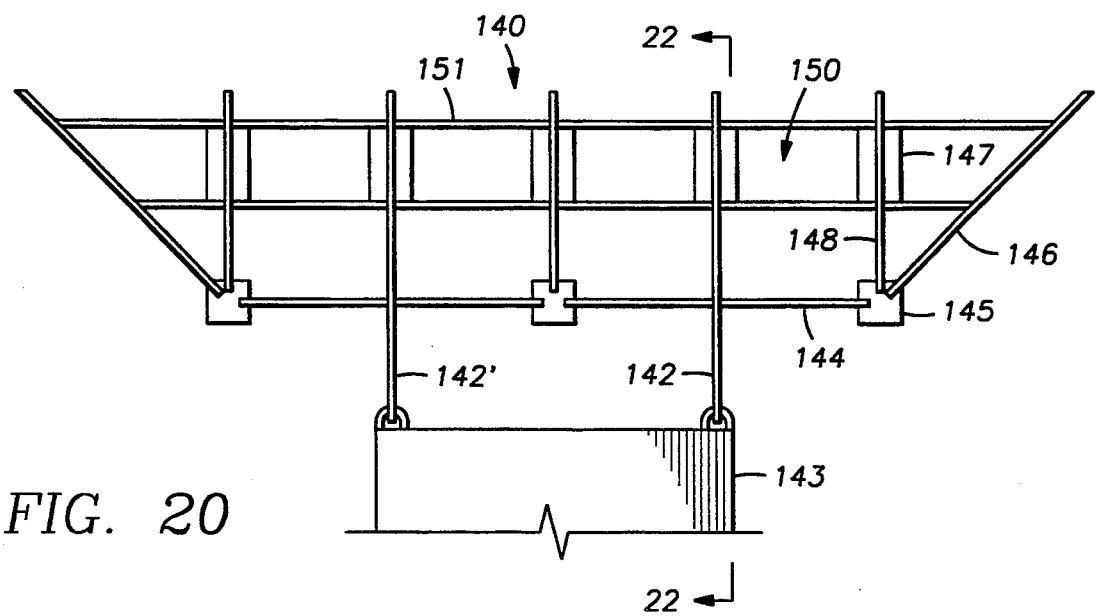
FIG. 20 is a plan view of a flexible applicator being drawn by a vehicle.

FIG. 19 shows details of the distributor 120, which discharges liquid in two directions as required for the applicator 130 of FIGS. 15 to 17. The same construction can be used for the distributor 120' of the applicator 110 in FIG. 18. This replaceable cartridge includes a housing 121, a compressed distribution tube 122 having a series of discharge openings 123, a porous-plastic strip 125, having a series of openings 124 along its center line, and silicone caulk 126 as indicated. When inserted between the apexes of the two bent sheets, as shown in FIGS. 16 and 17, the distributor 120 discharges liquid to the two sloping applicator surfaces at approximately equal rates.

Turning finally to FIGS. 20–23, there are shown several views of a light-weight, flexible herbicide applicator assembly 140 being drawn by a utility vehicle 143. The leading portion of the assembly 140 is flexibly attached to the vehicle by a pair of draw bars 142, 142'. The assembly 140 includes a flexible application panel 150, the draw bars 142, 142'; and a network braces 144, 146, 147 and flexible connectors 145. The flexible application panel 150 is bolted to the draw bars 142 and braces 148, with the aid of spacer bars 147. The entire applicator assembly 140 has the flexibility in the transverse direction needed to conform to uneven terrain, and the stiffness in the longitudinal direction required to maintain the applicator at the selected slope.

Figure 21A:
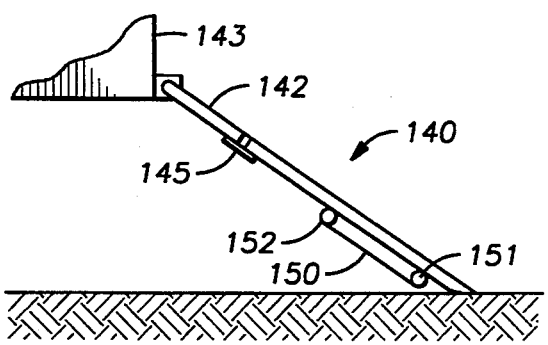
FIGS. 21A and 21B are respective side views of the applicator shown in FIG. 20 for two different adjustments of the mounting of a flexible applicator panel.
Figure 21B:
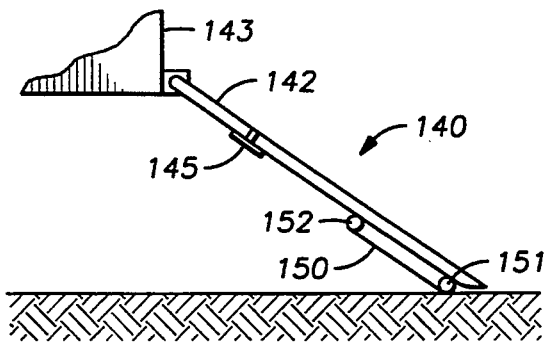

As shown in FIG. 21A, the mounting height of the flexible applicator panel 150 has been chosen so that the trailing portion 151 is raised above the ground and trailing ends of the draw bars 142, 142' and the braces 146, 148 slide on the ground. Alternatively, as shown in FIG., 21B, the mounting height of the flexible applicator panel 150 has been chosen so that the trailing portion 151 slides on the ground.

Figure 22:
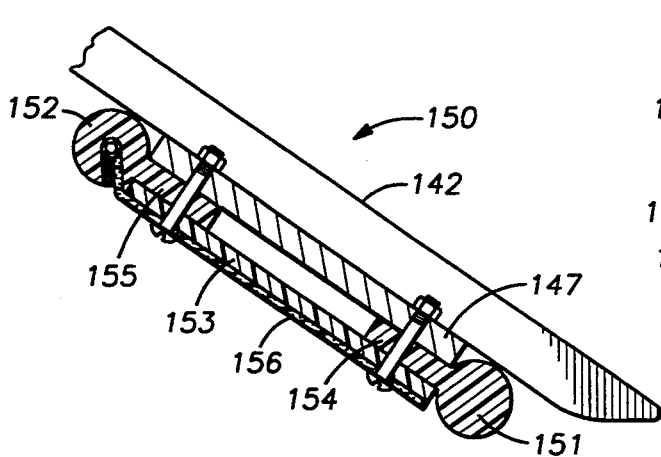
FIG. 22 is a cross sectional view along line 22—22 in FIG. 20 showing details of the applicator.

As shown in FIG. 22, the flexible application panel 150 consists of two halves of a standard "dogbone" shape having rounded portions 151, 152 and flat portions 154, 155, a flexible applicator back-up sheet 153, and a porous-plastic applicator sheet 156, all of which are fabricated of UHMW PE and fastened together by welding, gluing, and/or bolting.

Figure 23:
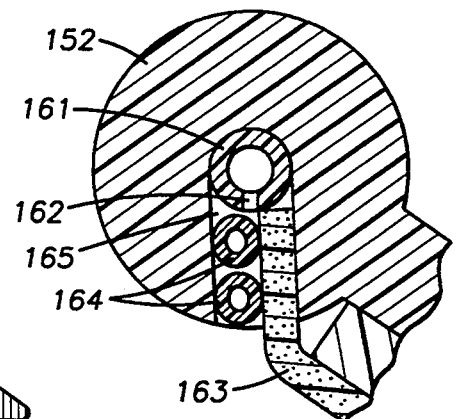
FIG. 23 is an enlarged view of a distributor shown in FIG. 22.

As shown in FIGS. 22 and 23, the application surface 156 is supplied with liquid via a tube 161, perforated holes 162, and a porous plastic strip 163. A pair of compressed tubes 164 seal the containment groove 165, forcing the liquid to follow the desired restrictive path.

What is claimed is:

1. A herbicide applicator assembly having an inclined underside liquid-application surface fed with liquid herbicide in such a manner that said liquid-application surface can wipe sufficient herbicide onto tall plants to kill them, while wiping only enough herbicide onto lower-growing plants to retard their growth, and while avoiding contact of said liquid-application surface with the ground, said herbicide applicator assembly comprising, in combination:

a rigid applicator panel providing said inclined underside liquid-application surface of non-absorbent, a source of said liquid herbicide for supplying said liquid herbicide to said inclined underside liquid-application surface at a sufficient flow rate for intended treatment and a sufficient pressure for proper distribution;

a distributor connected to said source of liquid herbicide for discharging said liquid herbicide uniformly along an upper edge portion of said inclined underside liquid-application surface; and means for supporting said rigid applicator panel with sufficient rigidity to keep said inclined underside liquid-application surface at a selected elevation above the ground and at a predetermined slope, with said slope and elevation being maintained accurately while said rigid applicator panel is moved along a swath of vegetation, said inclined underside liquid-application surface being inclined at a sufficient angle so that said liquid herbicide will flow from said upper edge portion of said inclined underside liquid-application surface slowly down said inclined underside liquid-application surface while clinging to said inclined underside liquid-application surface until said liquid herbicide is wiped from an upper portion of said inclined underside liquid-application surface by tall plants or from a lower portion of said inclined underside liquid-application surface by both tall and short plants, or until said liquid herbicide reaches a lower edge portion of said inclined underside liquid-application surface.

2. The combination as claimed in claim 1, wherein said source of said liquid herbicide comprises a container and an adjustable-rate pump.

3. The combination as claimed in claim 1, wherein said inclined underside liquid-application surface is smooth and non-porous, and has relatively little liquid-storage capacity, so that said inclined underside liquid-application surface can apply said liquid herbicide continuously at a uniform rate and in a relatively uniform manner to vegetation that is relatively uniform in size and spacing and can apply said liquid herbicide at highly variable rates to vegetation that is non-uniform in size or spacing.

4. The combination claimed in claim 1, wherein said inclined underside liquid-application surface is provided by material having cavities formed in the underside thereof to collect and store relatively large amounts of said liquid herbicide on said non-absorbent material providing said inclined underside liquid-application surface, as said plants being treated wipe said liquid herbicide into and out of said cavities, so that the stored liquid can be discharged at variable rates to vegetation that is non-uniform in size or spacing, while liquid herbicide is being fed to said inclined underside liquid-application surface at a uniform rate.

5. The combination claimed in claim 4, wherein said applicator panel includes a perforated sheet providing said inclined underside liquid-application surface and said cavities, said perforated sheet being cemented in said panel.

6. The combination as claimed in claim 1, wherein said inclined underside liquid-application surface is non-porous and wherein said rigid applicator panel includes a strip of absorbent material mounted along said lower edge of said inclined underside liquid-application surface and supported above the ground, said strip of absorbent material being provided to collect liquid herbicide that otherwise would drip, to wipe excess liquid herbicide from treated vegetation, to wipe collected liquid herbicide onto vegetation being treated, and to serve as an indicator, when too wet, that excess liquid herbicide is being fed.

7. The combination claimed in claim 1, wherein said means for supporting includes two runners and adjustable means for mounting said applicator panel above said runners at the selected elevation and slope, said adjustable means for mounting being isolated from said inclined underside liquid-application surface to prevent liquid herbicide from flowing from said inclined underside liquid-application surface to said means for supporting, so that said means for mounting can be positioned at any desired locations on said applicator panel.

8. The combination as claimed in claim 1, wherein said herbicide applicator assembly includes at least two of said rigid applicator panels, all connected together by hinges and supported by runners, so that the assembly is flexible enough in the transverse direction to be supported above the ground at the desired elevation and slope by said runners when said assembly is drawn in the longitudinal direction along ridges and swales.

9. A herbicide applicator comprising, in combination:

an applicator panel having an inclined underside surface of non-absorbent material for wiping vegetation, means for supporting said applicator panel at a selected elevation and slope with respect to ground elevation while said applicator panel is moved along a swath of the vegetation, a source of liquid herbicide; and a distributor connected to said source of liquid herbicide for discharging the liquid herbicide uniformly along an upper edge portion of the inclined underside surface, said inclined underside surface being inclined at a sufficient angle so that the liquid herbicide will flow slowly down the inclined underside surface without dripping before reaching a lower edge portion of the inclined underside surface, wherein said inclined underside surface is rough and has substantial liquid-storage capacity, so that said inclined underside surface can apply liquid herbicide at a variable rate to vegetation that is neither uniform in size nor spacing while being fed with said liquid herbicide at a uniform rate, wherein said inclined underside surface has grooves to thereby aid in maintaining a uniform distribution of the liquid herbicide in a direction along said grooves.

10. A herbicide applicator comprising, in combination:

an applicator panel having an inclined underside surface of non-absorbent material for wiping vegetation, means for supporting said applicator panel at a selected elevation and slope with respect to ground elevation while said applicator panel is moved along a swath of the vegetation, a source of liquid herbicide; and a distributor connected to said source of liquid herbicide for discharging the liquid herbicide uniformly along an upper edge portion of the inclined underside surface, said inclined underside surface being inclined at a sufficient angle so that the liquid herbicide will flow slowly down the inclined underside surface without dripping before reaching a lower edge portion of the inclined underside surface, wherein said liquid distributor comprises a channel member containing a perforated distribution tube, and a porous-plastic distribution strip sealed within said channel member such that liquid herbicide fed to the distribution tube exits the channel member through the pores in the porous-plastic distribution strip, thereby providing relatively uniform distribution of the liquid herbicide to the underside of the applicator panel.

11. A herbicide applicator comprising, in combination:

an applicator panel having an inclined underside surface of non-absorbent material for wiping vegetation, means for supporting said applicator panel at a selected elevation and slope with respect to ground elevation while said applicator panel is moved along a swath of the vegetation, a source of liquid herbicide; and a distributor connected to said source of liquid herbicide for discharging the liquid herbicide uniformly along an upper edge portion of the inclined underside surface, said inclined underside surface being inclined at a sufficient angle so that the liquid herbicide will flow slowly down the inclined underside surface without dripping before reaching a lower edge portion of the inclined underside surface, further comprising a channel member mounted beneath the lower edge of the applicator panel to serve as a drip collector, said channel member containing an absorbent material, which serves as a filter and a wiper, and means for eliminating excess liquid herbicide from said absorbent material.

12. A herbicide applicator comprising, in combination:

an applicator panel having an inclined underside surface of non-absorbent material for wiping vegetation, means for supporting said applicator panel at a selected elevation and slope with respect to ground elevation while said applicator panel is moved along a swath of the vegetation, a source of liquid herbicide; and a distributor connected to said source of liquid herbicide for discharging the liquid herbicide uniformly along an upper edge portion of the inclined underside surface, said inclined underside surface being inclined at a sufficient angle so that the liquid herbicide will flow slowly down the inclined underside surface without dripping before reaching a lower edge portion of the inclined underside surface, further comprising an additional applicator panel having its own supporting means, and wherein said applicator panels are connected together by hinges to treat a swath of vegetation having a width approximately equal to the sum of the widths of said applicator panels.

13. A herbicide applicator comprising, in combination:

an applicator panel having an inclined underside surface of non-absorbent material for wiping vegetation, means for supporting said applicator panel at a selected elevation and slope with respect to ground elevation while said applicator panel is moved along a swath of the vegetation, a source of liquid herbicide; and a distributor connected to said source of liquid herbicide for discharging the liquid herbicide uniformly along an upper edge portion of the inclined underside surface, said inclined underside surface being inclined at a sufficient angle so that the liquid herbicide will flow slowly down the inclined underside surface without dripping before reaching a lower edge portion of the inclined underside surface, wherein said means for supporting includes at least one bar having one end for attachment to a vehicle and another end which is curved for resting on the ground.

14. A liquid herbicide applicator assembly for treating a swath of vegetation, said assembly comprising, in combination:

an inflexible applicator panel having a non-absorbent underside liquid-application surface having pockets provided therein for retaining liquid herbicide on said surface until the liquid herbicide is wiped off onto vegetation, said panel being inclined so that the taller the plants being treated are, the more liquid herbicide they receive;

a source of liquid herbicide for supplying the liquid herbicide to said underside liquid-application surface at a sufficient flow rate for intended treatment and a sufficient pressure for proper distribution;

a distributor connected to said source and mounted to said applicator panel for distributing the liquid herbicide uniformly to an upper, leading-edge portion of said underside liquid-application surface; and a pair of parallel-spaced runners, each having at least one upstanding member; said applicator panel being mounted at selected points on said upstanding members so that said applicator panel is rigidly supported at a preselected elevation above said runners and at a predetermined slope that is accurately maintained so that the liquid herbicide fed along a leading edge portion of said underside liquid-application surface of said applicator panel will flow slowly down the non-absorbent, pocketed underside liquid-application surface without dripping until the liquid herbicide is wiped off by plants being treated or the liquid herbicide reaches a trailing edge portion of said underside liquid-application surface.

15. The herbicide applicator as claimed in claim 14, including a clamp at each of said selected points for clamping said applicator panel to a respective one of said upstanding members, said supporting members being isolated from said underside liquid-application surface so that liquid herbicide cannot flow from said underside liquid-application surface to said supporting members.

16. The herbicide applicator as claimed in claim 14, wherein said applicator panel further comprises a perforated sheet of non-absorbent material providing said underside liquid-application surface and said pockets, said perforated sheet being cemented to the underside of said panel.

17. The herbicide applicator as claimed in claim 14, wherein said applicator panel has absorbent material mounted along a trailing edge portion of said non-absorbent underside liquid-application surface.

18. The herbicide applicator as claimed in claim 14, wherein said distributor includes a strip of porous material aligned along said leading edge portion of said non-absorbent underside liquid-application surface and through which said liquid herbicide flows to said leading edge portion of said non-absorbent underside liquid-application surface.

19. A heavy-duty applicator assembly for applying liquid herbicide to vegetation, said assembly comprising, in combination:

an applicator panel including a rigid structural beam having a rectangular, non-absorbent, underside liquid-application surface having a leading edge portion and a trailing edge portion, said underside liquid-application surface being formed from a non-absorbent material and being inclined so that the taller the plants being treated are, the more of the liquid-application surface the plants are contacted by;

a source of the liquid herbicide;

a distributor for uniformly distributing said liquid herbicide from said source to said leading edge portion; and means for supporting said applicator panel at a slope such that said liquid herbicide fed to said leading edge portion will flow slowly down said rectangular, non-absorbent underside liquid-application surface, without dripping, until said liquid-herbicide is wiped off or reaches said trailing edge portion.

20. The combination as claimed in claim 19, wherein said rectangular, non-absorbent underside liquid-application surface has pockets formed therein, which are designed to collect and store liquid on said surface temporarily without dripping, so that liquid fed at a uniform rate can be discharged to plants at highly variable rates as needed.

21. The combination as claimed in claim 20, wherein said pockets in said underside liquid-application surface are provided by a perforated sheet of non-porous material that is cemented to the underside of said beam and serves as said non-absorbent underside liquid-application surface.

22. The combination as claimed in claim 19, wherein said distributor includes a strip of porous material aligned along said leading edge portion and through which said liquid herbicide flows to said leading edge portion.

23. The combination as claimed in claim 19, further comprising a portion of a hinge for connecting the applicator panel to a similar applicator panel.

24. The combination as claimed in claim 19, further comprising absorbent material mounted along said trailing edge portion of said rectangular, non-absorbent underside liquid-application surface.

25. A herbicide applicator including a distributor for distributing liquid herbicide, said herbicide applicator comprising, in combination:

a channel member;

a perforated distribution tube mounted in said channel member;

a source of said liquid herbicide, said source of liquid herbicide being connected to said perforated distribution tube for feeding said liquid herbicide under pressure into said channel member; and a porous distribution strip sealed in said channel member such that said liquid herbicide from said distribution tube must exit said channel member through said distribution strip, said perforated distribution tube being elongated and aligned along a length of said porous distribution strip, and said porous distribution strip having sufficient resistance to the passage of said liquid herbicide that said liquid herbicide is forced to be discharged uniformly along the length of said porous distribution strip.

26. The combination as claimed in claim 25, wherein said porous distribution strip comprises porous plastic.

27. The combination as claimed in claim 25, wherein said porous distribution strip is sealed into said channel member with adhesive.

28. The combination as claimed in claim 25, wherein said porous distribution strip is sealed into said channel member by resilient material forced into said channel member alongside said porous distribution strip.

29. A liquid herbicide applicator comprising, in combination:
an "A"-frame structure;
two opposing inclined applicator panels mounted within said "A"-frame structure;
a source of said liquid herbicide;
a distributor connected to said source and mounted above underside surfaces of said applicator panels for distributing liquid herbicide from said source uniformly to higher edge portions of said applicator panels, said applicator panels being mounted at inclinations sufficient that the liquid herbicide distributed to said higher edge portions flows down respective inclined underside surfaces of said applicator panels, without dripping, to respective lower edge portions of said underside surfaces.

30. The combination as claimed in claimed 29, wherein said applicator panels include perforated sheets providing said underside surfaces.

31. The combination as claimed in claim 30, including a thin porous plastic sheet covering said perforated sheets and having an apex mounted below said distributor to receive liquid herbicide from said distributor and to feed said liquid herbicide to said perforated sheets.

32. The combination as claimed in claim 29, wherein said "A"-frame structure covers and encloses said applicator panels.

33. The combination as claimed in claim 29, wherein said "A"-frame structure includes a plurality of baffles disposed approximately vertically and approximately perpendicular to both of said applicator panels.

34. The combination as claimed in claim 33, wherein said baffles receive liquid herbicide from said distributor, and said baffles are perforated to increase their liquid storage capacity.

35. The combination as claimed in claim 33, wherein at least some of said baffles extend below at least one of said applicator panels and have underside surfaces for resting upon ground elevation and acting as runners to establish an elevation for said applicator panels with respect to said ground elevation.

36. A semi-flexible liquid herbicide applicator assembly providing an inclined underside liquid-application surface for wiping liquids onto vegetation so that the taller the plants being treated are, the more liquid the plants receive, said assembly comprising, in combination:
a semi-flexible applicator panel of non-absorbent material providing said inclined underside liquid-application surface;
means for supporting said semi-flexible applicator panel at a predetermined inclination with respect to ground level so that when said semi-flexible applicator assembly is drawn in a longitudinal direction over unlevel terrain, said semi-flexible applicator assembly has sufficient flexibility in a transverse direction to conform to ridges and swales, and sufficient rigidity in the longitudinal direction to maintain the liquid-application surface at said predetermined inclination;
a source of said liquid herbicide for supplying said liquid herbicide at a sufficient flow rate for intended treatment and a sufficient pressure for proper distribution;
a distributor connected to said source of said liquid herbicide and mounted near an upper edge portion of said inclined underside liquid-application surface of said semi-flexible applicator panel for uniformly distributing said liquid herbicide from said source to said upper edge portion, said semi-flexible applicator panel being maintained at a sufficient inclination so that the liquid herbicide flows slowly down said inclined underside liquid-application surface without dripping before reaching a lower edge portion of said inclined underside liquid-application surface.

37. The combination as claimed in claim 36, wherein said means for supporting said semi-flexible applicator panel at a predetermined inclination with respect to ground level includes a flexible, replaceable wear strip of abrasion-resistant material fastened along a lower edge portion of said semi-flexible applicator panel, so that said wear strip is the only part of said applicator assembly that rests on the ground; and said means for supporting includes draw bars for connection to a vehicle.

38. The combination as claimed in claim 36, wherein said means for supporting includes a network of draw bars and braces that are connected together in such a manner that said flexibility and rigidity are maintained.

39. A liquid herbicide applicator comprising, in combination:
a flexible applicator panel having an inclined underside surface of non-absorbent material for wiping vegetation growing upon a ground elevation;
means for supporting said flexible applicator panel at a selected elevation and inclination with respect to said ground elevation so that said flexible applicator panel flexes in a transverse direction when drawn over uneven terrain in a longitudinal direction toward which said flexible applicator panel is inclined;
a source of said liquid herbicide;
a distributor connected to said source and mounted near an upper edge portion of said inclined underside surface of said flexible applicator panel for uniformly distributing said liquid herbicide from said source to said upper edge portion, said flexible applicator panel being mounted at a sufficient inclination so that the liquid herbicide flows slowly without dripping before reaching a lower edge portion of said inclined underside surface,
wherein said means for supporting includes a frame including bars which have end portions extending below said lower edge portion of said flexible applicator panel for running upon said ground elevation and thereby raising said lower edge portion above said ground elevation.

40. A liquid herbicide applicator comprising, in combination:
a flexible applicator panel having an inclined underside surface of non-absorbent material for wiping vegetation growing upon a ground elevation;
means for supporting said flexible applicator panel at a selected elevation and inclination with respect to said ground elevation so that said flexible applicator panel flexes in a transverse direction when drawn over uneven terrain in a longitudinal direction toward which said flexible applicator panel is inclined;
a source of said liquid herbicide;

a distributor connected to said source and mounted near an upper edge portion of said inclined underside surface of said flexible applicator panel for uniformly distributing said liquid herbicide from said source to said upper edge portion, said flexible applicator panel being mounted at a sufficient inclination so that the liquid herbicide flows slowly without dripping before reaching a lower edge portion of said inclined underside surface, wherein said distributor includes a channel member, a perforated distribution tube mounted in said channel member, and a porous distribution strip sealed in said channel member such that liquid from said distribution tube must exit said channel member through said distribution strip.

41. A herbicide applicator comprising:

an applicator panel supported at a selected elevation and slope with respect to ground elevation while the panel is moved along a swath of vegetation;

a source of liquid herbicide; and a distributor connected to said source for discharging the liquid herbicide uniformly along an upper edge portion of an underside surface of said applicator panel, said underside surface being inclined at a sufficient angle so that the liquid herbicide will flow slowly down the underside surface without dripping before reaching a lower edge portion of the underside surface;

wherein said underside surface is provided by a sheet of porous, non-absorbent material that has a thickness and porosity selected so that substantially all of the liquid herbicide fed to the upper edge of said underside surface flows downward on the underside surface, rather than through the pores and interstices of the sheet of porous material, so that said underside surface, including pores immediately adjacent to said liquid-application surface, can store and wipe sufficient herbicide onto randomly-spaced, tall plants to kill them, while wiping only enough herbicide onto lower-growing plants to retard their growth.

42. The combination as claimed in claim 41, wherein said liquid herbicide is viscous.

43. The combination as claimed in claim 41, wherein said liquid herbicide is a concentrated solution of the isopropylamine salt of N-(phosphonomethyl) glycine.

44. An applicator panel having a smooth, impervious underside surface of non-absorbent material for wiping liquid onto vegetation, said underside surface having a leading edge portion, and said applicator panel including a distributor for applying said liquid uniformly along said leading edge portion so that said liquid is applied preferentially to said vegetation and secondarily to said smooth, impervious underside surface.

45. The combination as claimed in claim 44, wherein said distributor includes a channel member defining a channel, and a porous plastic strip sealed within said channel so that liquid fed under pressure into said channel is forced to pass through restrictive pores of said porous plastic strip in order to exit said channel.

46. An applicator for applying liquid herbicide to vegetation, said applicator comprising, in combination:

a plate made from a non-porous, non-absorbent material providing a liquid-application underside surface having pockets formed therein for temporarily retaining liquid on said liquid-application surface; and a distributor mounted to said plate for distributing liquid herbicide to said underside surface.

47. The applicator as claimed in claim 46, wherein said plate is rectangular and is attached to a structural beam to provide rigidity.

48. A liquid herbicide applicator comprising, in combination:

a panel having an inclined underside surface and a multiplicity of vertical, rigid baffles connected to and extending downward from said underside surface;

means for supporting said panel at a selected elevation and slope with respect to ground elevation while said panel is moved along a swath of vegetation;

a source of liquid herbicide; and a distributor connected to said source of liquid herbicide for discharging said liquid herbicide uniformly along an upper edge portion of said inclined underside surface, so that the liquid herbicide will flow slowly down said inclined underside surface and also down the rigid baffles without dripping before reaching lower edge portions of said inclined underside surface and said rigid baffles.

49. The combination as claimed in claim 48, wherein said rigid baffles have lower edge portions at different heights with respect to said ground elevation.

50. The combination as claimed in claim 49, wherein a plurality of said rigid baffles have lower edge portions at the same lowest elevation for resting upon said ground elevation.

51. The combination as claimed in claim 49, wherein the different heights of said lower edge portions vary in a pattern for distributing said liquid herbicide to plants of various sizes and shapes.

52. The combination as claimed in claim 48, wherein said rigid baffles have different spacings from each other and vary in a pattern for distributing liquid herbicide to plants of various sizes and shapes.

53. A liquid herbicide applicator-distributor having an underside surface of non-absorbent material for applying liquid herbicide directly onto vegetation or to an adjacent surface that wipes the liquid herbicide onto vegetation, said applicator-distributor comprising, in combination:

a channel member;

a source of said liquid herbicide for feeding said liquid herbicide under pressure into said channel member; and an elongated porous distribution strip sealed in said channel member such that said liquid herbicide fed into said channel member must exit said channel member through said distribution strip to reach said underside surface, said distribution strip having sufficient inherent resistance to the passage of said liquid herbicide that said liquid herbicide is forced to be discharged uniformly along the length of said distribution strip.

54. The combination as claimed in claim 53, wherein said channel member contains a perforated tube for distributing said liquid herbicide within said channel member.

55. The combination as claimed in claim 53, wherein said underside surface is formed on an external surface of said channel member, and said channel member defines a groove into which said distribution strip is sealed.

56. A herbicide applicator comprising, in combination:
- an applicator panel of non-absorbent material supported at a selected elevation and slope with respect to ground elevation while the panel is moved along a swath of vegetation;
- a source of liquid herbicide; and
- a distributor connected to said source for discharging the liquid herbicide uniformly along an upper edge portion of an underside surface of said panel, said underside surface being inclined at a sufficient angle so that the liquid herbicide will flow slowly down the underside surface without dripping before reaching a lower edge portion of the underside surface;
- wherein said liquid herbicide is a viscous solution.

57. The combination as claimed in claim 56, wherein said liquid herbicide is a solution of about 41 percent of the isopropylamine salt of N-(phosphonomethyl) glycine.

* * * * *

UNITED STATES PATENT AND TRADEMARK OFFICE
CERTIFICATE OF CORRECTION

PATENT NO. : 5,388,369
DATED : February 14, 1995
INVENTOR(S) : James E. Moore

It is certified that error appears in the above-indentified patent and that said Letters Patent is hereby corrected as shown below:

Column 11, line 2, "112''''" should be --112'''---

Column 11, line 61: after "non-absorbent" insert
  --material--.

Signed and Sealed this

Twenty-fifth Day of April, 1995

Attest:

BRUCE LEHMAN

*Attesting Officer*   *Commissioner of Patents and Trademarks*